March 26, 1957   N. E. SLABAUGH   2,786,353
PITOT TUBE COVER
Filed Oct. 2, 1953

INVENTOR.
NORRIS E. SLABAUGH
BY Lockwood, Galt, Woodard, & Smith
ATTORNEYS

United States Patent Office 2,786,353
Patented Mar. 26, 1957

2,786,353

PITOT TUBE COVER

Norris E. Slabaugh, La Grange, Ind.

Application October 2, 1953, Serial No. 383,880

6 Claims. (Cl. 73—182)

The present invention relates to a Pitot tube cover and more particularly to such a cover which cannot interfere with proper Pitot tube operation if accidentally permitted to remain on the Pitot tube after the aircraft takes off.

Pitot tubes used on the larger types of aircraft serve to provide actuating power for such instruments as the air speed indicator, the altimeter and the rate-of-climb indicator. This tube normally projects axially forwardly from some forward structural element of the aircraft so as to open directly into the normal air stream, the tube serving to sample the velocity of this air stream and to forward the resulting actuating energy to the aforementioned indicators. Such Pitot tubes are normally provided with very tiny, forwardly opening apertures through which the air stream sample passes, so obviously should any foreign particles or material clog this opening, the aircraft indicating instruments associated therewith would become inoperative. In order to prevent this aperture from becoming clogged, a member of the aircraft maintenance crew ties a small canvas bag over the Pitot tube while the aircraft is on the ground. Just prior to take-off, this canvas bag is removed thereby exposing the tube aperture to the air stream.

In a number of instances involving aircraft crashes, the sole cause of the crash has been attributed to the failure of the crew member to remove the canvas bag from the Pitot tube. Thus, during take off, when the aircraft became airborne, the pilot had no indication of aircraft operation as usually given by the necessary indicating instruments. The air speed indicator, altimeter, and rate-of-climb indicator constitute essential instruments for maintaining the aircraft in proper flying attitude, these instruments bearing such importance to the job of piloting that the loss of any one seriously impairs the capabilities of the pilot to maintain the aircraft in proper flying attitude. In those instances wherein it has been determined that a crash was primarily attributable to the canvas bag not being previously removed from the Pitot tube, the pilot had no indication of air speed which resulted in the aircraft falling out of control usually during landing procedures.

In view of the foregoing, it is an object of this invention to provide a Pitot tube covering of such construction as will insure against any of the disastrous results mentioned in the foregoing.

It is another object of this invention to provide such a covering as may be manually detachably assembled to a Pitot tube for protecting the latter's aperture against clogging, and which will be ripped from the Pitot tube should a crew member forget to remove it prior to take off, by the usual air stream encountered during aircraft take-off.

It is yet another object of this invention to provide a Pitot tube covering which may be disassembled from the Pitot tube during take-off of the aircraft thereby preventing interference with the sampling of the air stream for operating the associated aircraft indicating instruments.

Other objects will become apparent as the description proceeds.

To the accomplishment of the above and related objects, my invention may be embodied in the form illustrated in the accompanying drawings, attention being called to the fact, however, that the drawings are illustrative only, and that specific change may be made in the specific constructions illustrated and described, so long as the scope of the appended claims is not violated.

Figure 1:
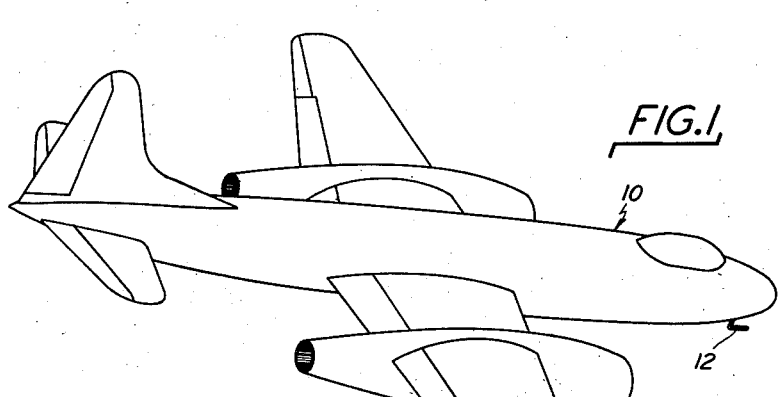
Fig. 1 is a pictorial illustration of an aircraft having a usual Pitot tube thereon.
Figure 2:
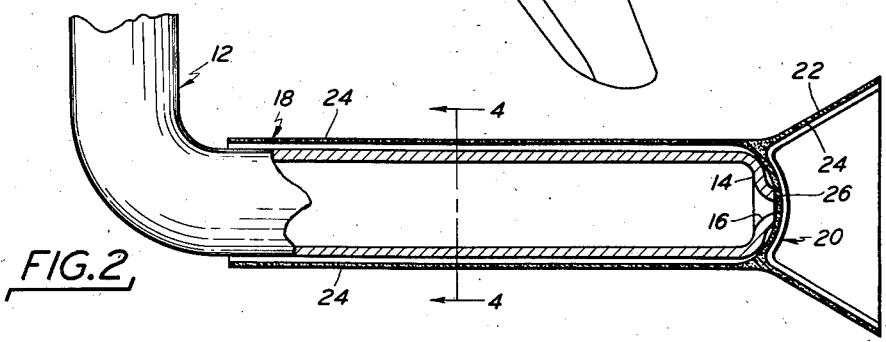
Fig. 2 is a longitudinal sectional view of an embodiment of this invention as assembled on a conventional Pitot tube.
Figure 3:
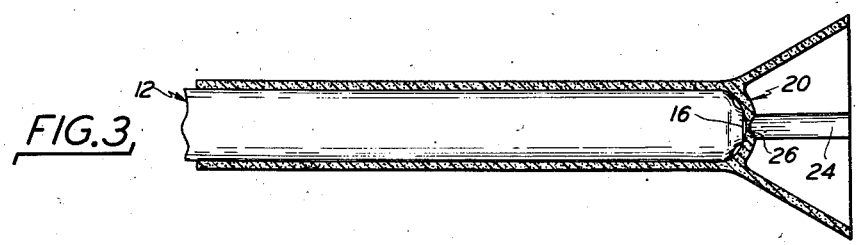
Fig. 3 is a similar sectional view of the same embodiment rotated ninety degrees with respect to Fig. 2.
Figure 4:
Fig. 4 is a cross-sectional view taken substantially on section lines 4—4 of Fig. 2.

Referring to the drawings, and more particularly to Fig. 1, a conventional multi-engine aircraft 10 has a Pitot tube 12 extending forwardly from the nose thereof as illustrated. This Pitot tube 12 in some instances is of elongated, tubular construction of either circular or oblong cross section as seen in Fig. 4. The outer or forward end 14 is formed inwardly so as to provide a stream-sampling aperture 16 through which air flows for communication to the usual indicating instruments. Thus far, the description is intended to disclose the usual Pitot tube constructions with which the present invention has particular valuable utility.

The covering embodiment of this invention is constituted by a shell 18 of such shape as to telescope over the Pitot tube 12 into reasonably snug engagement therewith. The forward end of the shell 18 is provided with an end closure 20 which completely covers the aperture 16 of the tube end 14. Extending forwardly from the end closure 20 is a funnel-shaped flange 22 which may be formed integrally with the shell 18 and enclosure 20 or secured thereto in some other manner as will become apparent from the following description.

This covering construction may be fabricated of any suitable material such as plastic or metal, the particular material selected for any given type of Pitot tube depending upon design specifications and requirements.

Figure 5:
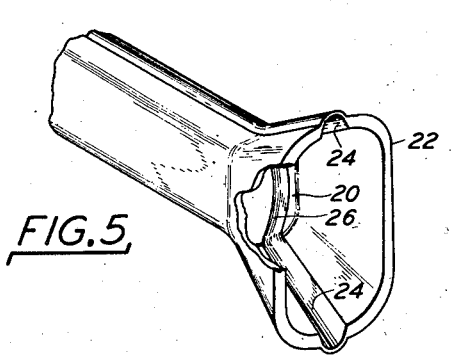
Fig. 5 is a perspective elevation of the embodiments of Fig. 2 and Fig. 3.

The entire covering extending between the extreme opposite ends of the shell 18 and the flange 22 is provided with a longitudinally extending weakened portion in the form of a thin section ridge indicated by the reference numeral 24. This ridge portion is illustrated more clearly in Figs. 4 and 5 and is preferably provided on diametrically opposite sides of the covering structure as indicated. In addition to extending the full length of the covering, the ridge 24 is also extended across the end closure 20 as indicated by the reference numeral 26. These relatively thin section ridges are so designed that a distending force of predetermined magnitude applied internally of the flange 22 will serve to rip the covering apart along the ridge portions 24, 26.

In operation, with the covering assembled to the Pitot tube 12, should the crew member forget to remove the covering from the Pitot tube and the pilot take the ship off the ground, the air stream entering the funnel-shaped flange 22 will exert a distending force ripping the latter apart along the weakened ridges 24, 26 thereby completely tearing the covering away from the Pitot tube. The parts of the covering will thereupon fall through free space away from the ship.

It will now be obvious that crashes or similar accidents resulting from a crew man's error of leaving a canvas covering or the like on the Pitot tube will be entirely obviated thereby providing great savings in the way of injuries and losses of life and property. The extreme simplicity of manufacturing and assembling this invention is adapted particularly for the intended purpose thereby leaving no objections as to economy measures even as compared to the former canvas bag tube coverings.

As mentioned earlier, different materials may be utilized for fabricating this invention, but for one type of Pitot tube, the preferred material is a plastic of highly frangible characteristics such that once a rip starts along the weakened ridge 24 the covering will essentially disintegrate and fall away from the tube.

What is claimed is:

1. A Pitot tube covering comprising a shell adapted to be telescoped over a Pitot tube, said shell having an end closure provided with a funnel-like flange and a longitudinally weakened portion which will break upon the application of an air blast of predetermined force into said funnel-like flange whereby the shell will separate from the aforementioned Pitot tube.

2. A Pitot tube covering comprising a shell adapted to be telescoped over a Pitot tube, said shell having an end closure provided with a funnel-like flange and a longitudinally weakened portion which will break upon the application of an air blast of predetermined force whereby the shell will separate from the aforementioned Pitot tube, said weakened portion being constituted by a cross-section of material which is of thinner dimension than the normal wall thickness of said shell.

3. A Pitot tube covering comprising a shell adapted to be telescoped over a Pitot tube, said shell having an end closure on its forward end, and a forwardly projecting funnel-shaped flange carried on said end closure, both the shell and flange having longitudinally coextending weakened portions which will break apart when an air blast of predetermined force is directed into said funnel-shaped flange whereby the shell will be separated from the Pitot tube.

4. A Pitot tube covering comprising a shell adapted to be telescoped over a Pitot tube, said shell having an end closure on its forward end, and a forwardly projecting funnel-shaped flange carried on said end closure, both the shell and flange having longitudinally coextending weakened sections constituted by a reduced thickness of wall dimension which will break apart when an air blast of predetermined force is directed into said funnel-shaped flange whereby the shell will be separated from the Pitot tube.

5. A Pitot tube covering comprising a shell adapted to be telescoped over a Pitot tube, said shell having an end closure on its forward end, and a forwardly projecting funnel-shaped flange carried on said end closure, both the shell and flange having longitudinally coextending weakened sections constituted by a reduced thickness of wall dimension which will break apart when an air blast of predetermined force is directed into said funnel-shaped flange whereby the shell will be separated from the Pitot tube, the shell and flange being of integral construction, the weakened sections in the flange also extending across the face of the end closure.

6. In combination with a Pitot tube, a Pitot tube closure device comprising a covering body having a hollow interior adapted to receive a Pitot tube, the forward end of said body being closed to thereby cover the apertured end of the covered Pitot tube, and an air stream-deflecting element carried by said body, said element and said body being formed with zones sufficiently weakened that an air stream developed by the aircraft and bearing on said element tears the body along the weakened portion to remove it from the Pitot tube.

References Cited in the file of this patent

UNITED STATES PATENTS

| | | |
|---|---|---|
| 2,385,051 | Berlin | Sept. 18, 1945 |
| 2,488,810 | Easterday | Nov. 22, 1949 |
| 2,532,316 | Larkin | Dec. 5, 1950 |

FOREIGN PATENTS

| | | |
|---|---|---|
| 499,429 | Great Britain | Jan. 24, 1939 |